United States Patent [19]

Witwer

[11] Patent Number: 4,480,379
[45] Date of Patent: Nov. 6, 1984

[54] STACK HEIGHT ADJUSTMENT FOR COIL PLACING MACHINES

[75] Inventor: Keith A. Witwer, Fort Wayne, Ind.

[73] Assignee: Industra Products, Inc., Fort Wayne, Ind.

[21] Appl. No.: 489,515

[22] Filed: Apr. 28, 1983

[51] Int. Cl.³ .......................................... H02K 15/10
[52] U.S. Cl. ...................................... 29/596; 29/734; 29/736
[58] Field of Search ................. 29/596, 734, 736, 732, 29/606

[56] References Cited

U.S. PATENT DOCUMENTS

| | | | |
|---|---|---|---|
| 3,324,536 | 6/1967 | Hill | 29/205 |
| 3,698,063 | 10/1972 | Smith | 29/205 R |
| 3,722,063 | 3/1973 | Arnold | 29/205 R |
| 3,828,830 | 8/1974 | Hill et al. | 140/1 |
| 3,829,953 | 8/1974 | Lauer et al. | 29/205 E |
| 4,156,964 | 6/1979 | Walker | 29/734 |

Primary Examiner—Carl E. Hall
Attorney, Agent, or Firm—Albert L. Jeffers; Douglas L. Miller

[57] ABSTRACT

Improvements in adapting coil placing machines to accommodate cores of differing sizes such as varying stack heights is disclosed wherein a ram actuated stripper which normally engages and urges coils along finger elements into a magnetic core is extended to mechanically couple a portion of a shaft supporting those finger elements with a portion of the stripper actuating rod so as to prevent relative rotation between those two coupled portions and then the coupled portions are rotated together while holding the stripper and finger elements in a rotationally fixed position so as to allow a threaded interconnection coupling the fingers to the finger support shaft as well as a threaded interconnection coupling the stripper to the stripper actuating ram portion to move both the stripper and the fingers axially within the machine. Movement of the finger elements also changes the location of a rest or home position for the stripper so that during machine use the stripper executes a fixed stroke length independent of the stack height to which the machine has been adjusted.

20 Claims, 2 Drawing Figures

STACK HEIGHT ADJUSTMENT FOR COIL PLACING MACHINES

BACKGROUND OF THE INVENTION

The present invention relates generally to the insertion of prewound coils in dynamoelectric machines stator cores and more particularly to a method and apparatus for the insertion of such prewound coils which is readily adapted to various stator core dimensions such as adapting the machine to stator cores of like cross-sectional configuration but varying stack heights.

A number of machines have been devised for inserting prewound coils, as well as, optionally, insulating wedges into stator cores. One such coil placing machine is illustrated in the Hill U.S. Pat. No. 3,324,536. In the Hill device, as in the present invention, preformed coils, for example formed on winding machines of a known type, are placed over appropriate tooling blades or fingers of the placer for subsequent insertion into a stator. Thus coils for all of the poles of the machine to be produced may be placed on the tooling blades and if desired auxiliary or start windings, as well as main windings, may be placed on the blades and inserted into the stator core by but a single axial pass of a stripper along the blades to engage and urge those windings into and partially through the stator core. Various insulating wedges may be inserted into the stator core slots, either to separate windings or to isolate the windings from the stator bore, and such insertion processes may be effected in a single stage operation or in several stages as desired.

The above-mentioned Hill coil placing machine provides for rather rudimentary modifications to accommodate stators of different stack height. To maintain the end turns of the coils at a reasonable minimum when they are positioned in a stator, and of course to accommodate a given coil within the stator for which it is designed, the finger elements or blades should extend about to or just beyond the stator end face and similarly the maximum extension or travel of the stripper through the stator bore should be at most only slightly beyond that necessary to place the windings into the stator. When changing from one stack height to another, the Hill machine provides for the insertion of tubular spacers of a preselected length in conjunction with a certain amount of lost motion in the connection between a stripper actuating ram and the stripper so that the length of the stroke taken by the stripper is appropriate to the particular axial length of the stator being then provided with windings. Similarly, the Hill device provides for adjustment movement of the finger elements or blades and also of so-called wedge guide members by loosening a plurality of screws which hold those fingers and wedge guides in place and this type operation amounts to the individual repositioning or removal of the pertaining blades and guides. While effective, this blade and wedge guide adjustment process was sufficiently time consuming and difficult that an arrangement for simultaneously gripping and moving the blades when the screws were loosened was devised and is disclosed in the Walker et al U.S. Pat. No. 3,402,462.

There have been further attempts to simplify the process of accommodating such a coil placing machine to operate on stators of varying stack height. For example, adjustment of the blades or finger elements by using a centrally tapped blade holder and a threaded tooling shaft, rotatable by a wrench, have been used in several versions with U.S. Pat. No. 3,698,063 being exemplary of such approaches. Typically, the stripper must be removed to allow access by the wrench to make the adjustment.

Also, special machines, for example as illustrated in U.S. Pat. No. 3,829,953, have been designed to achieve multiple adjustments simultaneously. The exemplary patented device employs a chain driven set of variable height control surfaces and an axial stripper drive shaft including a slip clutch connection. This exemplary device varies the height of the stator clamping arms, wedge length, the stroke of the stripper, and the tooling blade axial extent. The approach of this last-mentioned exemplary patented device is not easily adaptable to the vast number of machines already in the field and is rather costly in its implementation.

A substantial improvement in stack height adjusting techniques as thus far discussed is represented by U.S. Pat. No. 4,156,964 assigned to the assignee of the present invention. In this patented device an axially fixed rotatable blade support shaft threadedly engages an axially moveable but rotationally fixed blade holder so that shaft rotation effectively extends or retracts the blades. A ram for actuating the coil stripper is formed of a pair of threaded members so that the stripper may be extended and a pin couples the blade support shaft to the ram and these two members are rotated relative to the stripper and fingers so that the ram extends or retracts relative to the machine the same distance that the fingers extend or retract. On retraction of the stripper, the support shaft is engaged and the stripper actuating ram separates from the stripper. Hence, in the retracted position the stripper rests at a location which is independent of the stack height to which the machine is adjusted. With the stripper returning to a fixed or invariable home position throat room within the coil placer tooling is unduly restricted by the stripper. Also in this patented arrangement the range of stack heights accommodatable is not as great as it might desirably be. Also while this last mentioned patented arrangement may be employed in coil placing machines of the type having certain fingers or blades moveable with the stripper the free ends of the moving blades align with the free ends of the fixed blades only for one particular stack height and to achieve the uniform location of all blade free ends with other stack heights requires the substitution of shorter or longer moving blades on the stripper.

SUMMARY OF THE INVENTION

Among the several objects of the present invention may be noted the achievement of the above noted goals and the avoidance of the above noted deficiencies; the provision of an improved method of adapting a coil placing machine to accommodate magnetic cores of differing sizes; the provision of a method and apparatus for adjusting the extension of blades for receiving a stator core in a coil placing machine and the correlative adjustment of the home position of a reciprocable coil stripper so that stripper stroke length is a constant independent of the particular stack height to which the machine is adjusted; and the provision of a stack height adjusting feature wherein the axial distance between finger element free ends and stator supporting wedge guide ends is varied and simultaneously therewith the axial location of a stripper home position is varied a like distance so as to maintain constant the axial separation between the finger element free ends and the stripper home position. These as well as other objects and advantageous features of the present invention will be in part apparent and in part pointed out hereinafter.

In general, modification of a coil placing machine is achieved by extending the stripper actuating ram and stripper to interlock the ram and a finger support shaft so as to prevent relative rotation therebetween whereupon corotation of the ram and finger support shaft axially moves the finger elements, lengthens the ram and moves the stripper home position and final position.

Also in general a coil placing machine includes an arrangement for selectively varying a stripper home position axially relative to wedge guides in the machine as well as selectively varying the axial position of the finger elements relative to those wedge guides in a coordinated manner so that the finger elements and stipper home position move in unison.

BRIEF DESCRIPTION OF THE DRAWINGS

Corresponding reference characters indicate corresponding parts throughout the several views of the drawing.

The exemplifications set out herein illustrate a preferred embodiment of the invention in one form thereof, and such exemplifications are not to be construed as limiting in any manner the scope of the disclosure of the scope of the invention.

DETAILED DESCRIPTION OF THE PREFERRED EMBODIMENT

Figure 1:
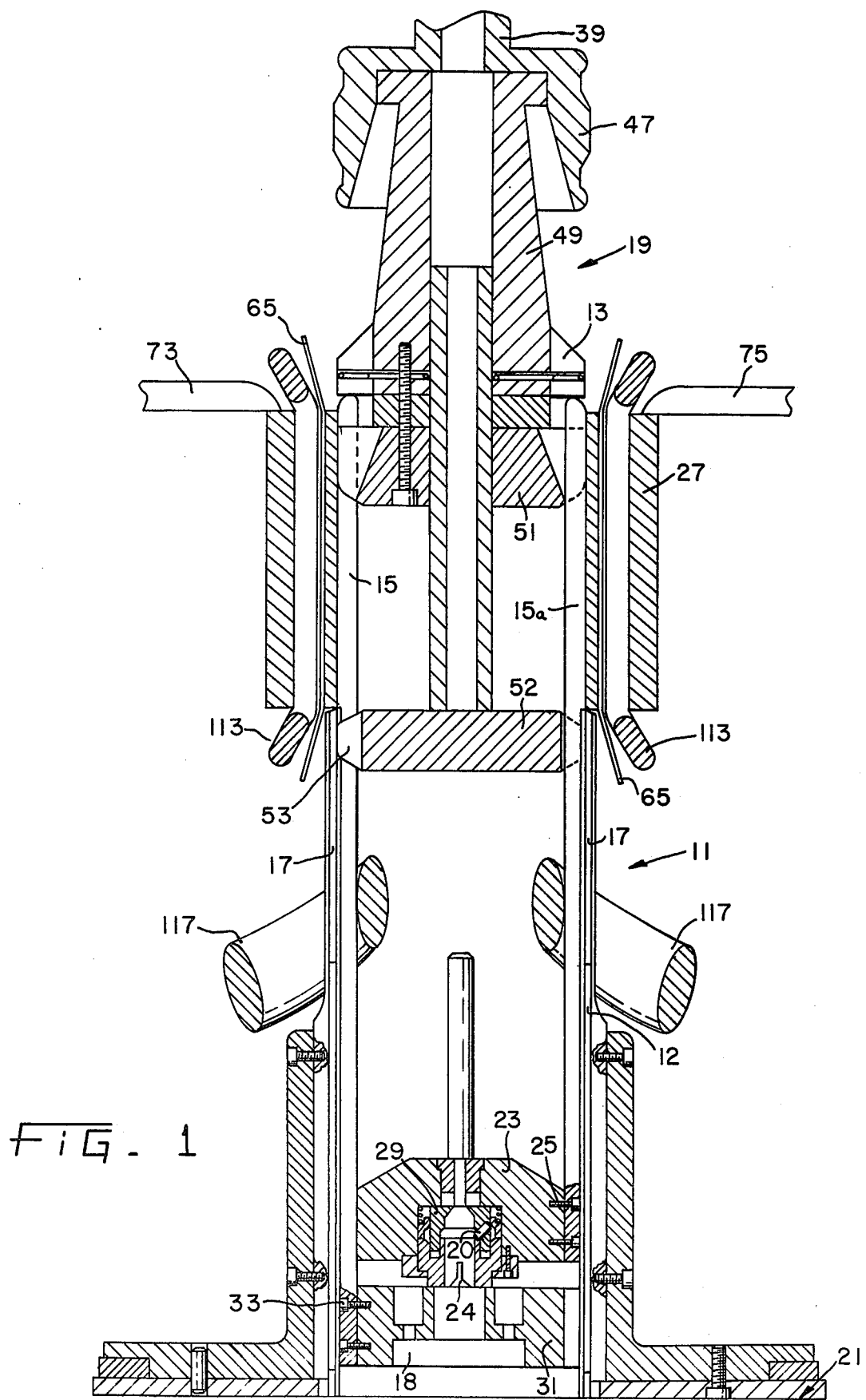
FIG. 1 is a side elevational view in section of the tooling of a coil placing machine including stator gauge and blade aligning superstructure.
Figure 2:
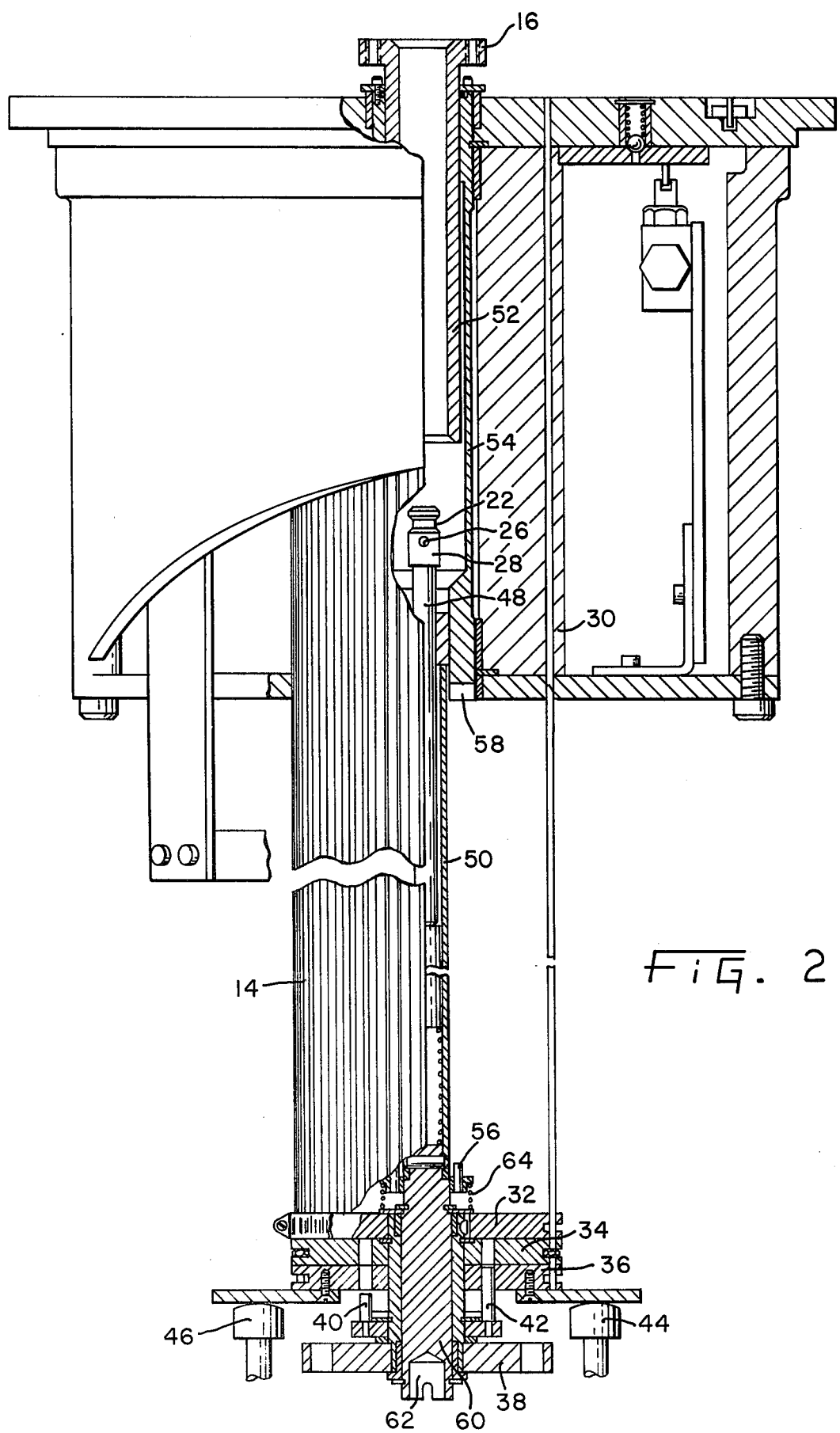
FIG. 2 is a side elevational view primarily in section of the coil placing machine lower tooling with stack height adjusting capability.

FIG. 1 illustrates with but slight modification to adapt it to the particular lower tooling illustrated in FIG. 2 the upper tooling of a coil placing machine substantially like that disclosed in my commonly assigned co-pending application Ser. No. 472,718, filed about Mar. 7, 1983, and entitled "Method and Apparatus for positioning Intermediate Insulators in Cores". As more completely described in my copending application the coil placer tooling 11 may for example be supported on a rotatable turntable which moves tooling 11 between a position where coils are wound and located between pairs of blades or finger elements such as 15 and between corresponding wedge guides such as 17 and a location where preformed wedges 12 are positioned between certain pairs of the wedge guides 17 and finally to a location in axial alignment with the insulation positioning member 19 which also functions as a stator gauge and blade aligning tool. The upper tooling 11 may be rotatable under control of a drive gear 21 for receiving more than one coil or winding and will typically include, in addition to the finger elements such as 15 and wedge guides such as 17, a stripper 23 which may as illustrated in the Donovan U.S. Pat. No. 3,689,976 have certain alternate ones of the blades or finger elements 15a attached thereto for movement therewith as by screws such as 25, or stripper 23 may be movable relative to all of the blades such as 15. In either case the function of stripper 23 is to engage the prewound coils leading them through a stator core and urging side turn portions of those coils into corresponding slots of that core. Stripper 23 is actuated or controlled by a stripper drive rod and coupled thereto by the disconnect coupling 29. The upper tooling 11 additionally includes an axially movable blade support member 31 which may support all or as illustrated only certain alternate ones of the blades such as 15 which would be fastened thereto by bolts or screws such as 33.

The insulation positioning member 19 includes, in addition to the actuating rod 39, a gauge tool portion 47 which aids in maintaining proper alignment with a magnetic core, a frustoconical portion 49 for supporting the lead end portions of phase insulators and blade alignment portions 51 and 52 including fins such as 53 which extend between adjacent finger elements 15.

The stator gauge and blade aligning tool 19 includes a first portion in the form of an upper blade aligning tool 51 and a lower blade aligning tool 52 which engages the blades 15 to maintain proper alignment and separation of those blades during the coil inserting process. Tool 19 also includes a second portion 47 which functions to axially and radially align stator cores with the coil placing apparatus blades when such stator cores are placed on the tooling for receiving coils. Tool 19 also includes an intermediate portion for supporting insulators in position to be transferred to a stator core 27 by relative motion between the core and tool 19. The intermediate portion of the tool 19 includes a first frustoconical insulation support 49 having a gradual taper in the axial direction and a second frustoconical insulation end support 13 having a substantially more abrupt taper in the axial direction. This more abrupt taper which aids ultimate placement of the insulators in the stator core slots may be on the order of 45° to the axis of the tool. The outermost edges of this abruptly tapered portion 13 has an outside diameter only slightly less than the diameter of the bore in the stator core.

In operation the stator core 27 might typically have the coils 113 positioned therein during a previous processing step and the phase insulators 65 would be appropriately positioned on the insulation positioning member 19 whereupon passage of the stator core 27 over the tool 19 would cause the insulators 65 to be stripped off of the tool 19 and into their appropriate stator core slots preparatory to the insertion of the coils 117. The clamps or arms 73 and 75 would be positioned so as to clamp stator core between those arms and the upper ends of the wedge guides 17 whereupon the stripper ram 12 and wedge push rods 14 of FIG. 2 would begin their upward movement to cause stripper 23 to engage and move the coils 117 into position in the core 27 and to position bore insulating wedges radially inwardly of those coils.

Reference may be had to my aforementioned copending application and the patent literature cited therein for further details of the operation of such upper placer tooling as depicted in FIG. 1 and possible variations thereon.

The finger or blade holder 31 receives the flange 16 of FIG. 2 in recess 18 and the flange 16 may be fastened to the finger holder 31 by bolts passing through the illustrated holes. The coupling 29 of stripper 23 includes a detent pin 20 for releaseably gripping the groove 22 in the free end 28 of the stripper actuating ram. Coupling 29 also includes a slot 24 for receiving pin 26 so that the free end 28 of the stripper actuating ram will not rotate relative to the stripper 23 when the ram is engaged with the stripper. When the ram and stripper are disengaged, the stripper 23 rests on the blade or finger holder 31 in its rest or home position as illustrated in FIG. 1.

The lower placer tooling of FIG. 2 includes a wedge magazine 30 which is rotatable about the axis of the tooling and receives insulating wedges such as slot lining wedges which are subsequently displaced therefrom into a stator core by upward movement of the wedge pushrods 14. These wedge pushrods are supported in a generally circular pattern about wedge pushrod support 32 and support 32 is in turn supported by a pair of rotatable wedge length compensating members 34 and 36. Axial drive upwardly as viewed of the pushrods 14 and stripper actuating rod is imparted to member 38 which supports pins 40 and 42. The angular position of the rotatable members 34 and 36 determines whether or not those members accept pins such as 40 and 42 thereby determining the stroke of the wedge pushrods 40 so as to compensate that stroke to varying wedge lengths as more fully described in U.S. Pat. No. 3,888,638.

At the lower extreme of the tooling movement, the wedge pushrod actuating structure rests on supports 44 and 46 and when the drive plate 38 is urged upwardly as to insert coils in a stator core, the wedge pushrods 14 as well as a stripper ram including the ram free end 28 and the threadedly telescoped ram portions 48 and 50 move upwardly with the ram free end 28 picking up the stripper 23 and moving it upwardly to engage and insert the coils.

The flange 16 which is fastened to the finger support member 31 includes a threaded shaft portion 52 which is threadedly coupled to an axially fixed threaded finger support member 54. It is the threaded coupling between the finger element support shaft 52 and support member 54 on the one hand, and ram portion 48 and ram portion 50 on the other hand, that provides the stack height adjustment feature of the present invention.

When the stripper is actuated to its completely extended position by upward movement of the drive plate 38, a pin 56 having an angular fixed location relative to the adjust drive member 60 engages a slot 58 in the interiorly threaded finger support member 54. By inducing rotation of the adjusting member 60 as by a screwdriver or hand drill actuated tool engaging the slot 62 or by imparting rotation to the adjusting member 60 by a more sophisticated automatic stack height arrangement causes, by way of the pin 56, rotation of the axially fixed finger support member 54 and rotation of the ram portion 50. In this stripper extended position, pin 26 engages slot 24 in the stripper and since the stripper peripheral portions are held fixed by the blades 15, stripper rotation is prevented as is rotation of the ram free end 28 and exteriorly threaded ram portion 48. Thus, depending upon the direction of rotation of the adjusting member 60, the effective length of the ram is increased or decreased by the threaded coupling between the ram portions 48 and 50. Similarly since the fingers 15 and finger support 31 engage the wedge guides 17 and other upper tooling portions which are relatively rotationally fixed, the rotation of adjusting member 60 induces rotation of axially fixed internally threaded finger support member 54 and, due to its threaded coupling to the finger element support shaft 52, causes axial movement of shaft 52, flange 16 and, therefore, of the finger support 31 and fingers affixed thereto. Since downward stripper motion is arrested by engagement between the stripper and the support member 31, movement of this support member necessarily changes the home stripper location at the same time. Hence, when the stripper is in its home position, the free ends of the cantilever supported fingers 15, which extend from support member 31, and the free ends of the cantilevered fingers 15a which are supported by and move with the stripper retain their same relative position regardless of the particular stack height to which the system is adjusted. This facilitates stator placement on the fingers such as 15 and 15a and further facilitates the draping of phase insulators over those finger elements as compared to prior art techniques where the relative positioning of the finger element free ends changes with changes in the stack height adjusting system.

Typically, the thread pitch of the threads coupling the two stator ram portions together will be the same as the pitch of the threads coupling the two finger element support shaft portions together so that the change in stripper ram length is the same as the change in the extension of the finger elements and since the overall stroke of the ram as imparted thereto by the actuating plate 38 is fixed, the free travel of end 28 of that ram remains constant as does the length of stroke of the stripper when free end 28 engages the stripper. A coil spring 64 allows pin 56 to be depressed in the event that the angular orientation is not appropriate for engaging pin 56 with slot 58. Of course, when rotation of the member 60 commences, pin 56 eventually aligns with slot 58 and spring 64 urges the pin into engagement with the slot to drive the stack height adjusting portions.

As thus far described, during a stack height adjustment the stripper home position, stripper final position and blade height regardless of whether those blade are all fixed or alternate ones moveable with the stripper are all modified to suit the prospective stator configuration. It is frequently desirable to also vary the length of the insulating wedge being cut and inserted into the wedge magazine 30 and this variation in wedge or separator length may be accomplished by known prior art techniques, for example, the hydraulic arrangement of U.S. Pat. No. 3,694,887. Other techniques for varying wedge length simultaneously with the changes in stripper home and final or extended positions as well as blade height will suggest themselves to those of ordinary skill in the art.

From the foregoing it is now apparent that a novel method and apparatus for adapting a coil placing machine to stators having various stack heights has been disclosed which, due to the variable location of the stripper home position completely down against the blade holding structure allows for a substantially maximum length blade and therefore wide range of adjustment to varying stack heights as well as substantially maximized throat room above the stripper in its home position and within the circular blade array for accepting phase insulators, coils, stator gauge and blade alignment tools, and the like, which improved method and apparatus meets the objects and advantageous features set out hereinbefore as well as others. Modifications as to the precise configurations, shapes and details may be made by those having ordinary skill in the art without departing from the spirit of the invention or the scope thereof as set out by the claims which follow.

What is claimed is:

1. In a coil placing method using a machine having a plurality of generally parallel upstanding finger elements supported on a shaft and disposed generally in a circular pattern for supporting coils and a magnetic core into which the coils are to be placed, a reciprocable ram, and a reciprocable ram actuated stripper selectively separable from the ram and movable axially along the finger elements from a home position to engage and move the coils into the magnetic core, the improved method of adapting the machine to accommodate magnetic cores of differing sizes comprising the steps of:

mechanically coupling a portion of the finger support shaft and a portion of the stripper actuating ram together to prevent relative rotation between the coupled portions;

imparting a corotational motion to the coupled portions while holding the stripper and finger elements rotationally fixed so that a threaded interconnection coupling the fingers to the finger support shaft portion moves the fingers and the stripper home position axially relative to the finger support shaft portion and a threaded interconnection coupling the stripper to the stripper actuating ram portion moves the stripper axially relative to the stripper actuating ram portion.

2. The improved method of claim 1 wherein the threaded interconnections have a common thread pitch so that imparted corotational motion induces axial movement of the stripper, and stripper home position and fingers through a common distance and the axial home position of the stripper relative to the fingers remains fixed.

3. The improved method of claim 1 wherein the distance traversed by the stripper under ram actuation is constant and independent of the core size accommodated.

4. The improved method of claim 1 wherein additional finger elements are fastened to the stripper to lie within the generally circular pattern and extend generally parallel to said upstanding finger elements, the method including maintaining the positions of said upstanding finger elements relative to the additional finger elements constant when the stripper is in the home position independent of the core size accommodated.

5. The improved method of claim 1 wherein the machine includes a second ram portion having one end for selectively engaging the stripper and a threaded section comprising the threaded interconnection coupling the stripper to said stripper actuating ram portion, the stroke of the second ram portion one end being of a constant magnitude starting from a position which is variable depending on the size stator being accommodated.

6. In a coil placing method using a machine having a plurality of generally parallel upstanding finger elements disposed generally in a circular pattern for supporting coils and a magnetic core into which the coils are to be placed, a plurality of wedge guides adjacent the finger elements having ends against which a magnetic core rests for receiving coils, and a stripper movable axially along the finger elements from a home position to engage and move coils into a magnetic core, the improved method of adapting the machine to accommodate magnetic cores of differing size comprising the steps of:

varying the axial distance between finger element free ends and the wedge guide ends; and varying the axial location of the stripper home position by a like distance so as to maintain constant the axial separation between the finger element free ends and the stripper home position.

7. The improved method of claim 6 wherein the distance traversed by the stripper during coil placement is constant and independent of the core size accommodated.

8. The improved method of claim 6 wherein additional finger elements are fastened to the stripper to lie within the generally circular pattern and extend generally parallel to said upstanding finger elements, the method including maintaining the positions of said upstanding finger elements relative to the additional finger elements constant when the stripper is in the home position independent of the core size accommodated.

9. The improved method of claim 6 wherein the varying steps are effected contemporaneously.

10. The improvement of claim 9 including the preliminary step of moving the stripper from the home position to an extended position preparatory to the steps of varying.

11. The improvement of claim 6 wherein the varying steps are accomplished by simultaneously revolving portions of threaded couplings associated with a finger support arrangement and a stripper actuating drive rod respectively.

12. In a coil placing machine having a plurality of generally parallel upstanding finger elements disposed generally in a circular pattern for supporting coils and a magnetic core into which the coils are to be placed, a plurality of relatively fixed wedge guides adjacent the finger elements having ends against which a magnetic core rests for receiving coils, a reciprocable ram, and a reciprocable ram actuated stripper movable axially along the finger elements from a home position to engage and move the coils into the magnetic core, the improvement comprising:

means for selectively varying the stripper home position axially relative to the wedge guides;

means for selectively varying the axial position of the finger elements relative to the wedge guides; and means coordinating operation of the respective selectively varying means to move the finger elements and stripper home position in unison.

13. The improvement of claim 12 wherein the length of stroke of the ram executed during reciprocation is fixed, the improvement further comprising means for selectively varying the length of the ram while preserving the fixed stroke length.

14. The improvement of claim 13 wherein the ram comprises a pair of threadedly coupled portions, the means for selectively varying ram length comprising means for holding one portion in a fixed angular position and means for rotating the other portion.

15. The improvement of claim 14 wherein the ram and stripper are selectively disengageable, the home position for the stripper comprising an impediment to stripper motion in one direction which when engaged by the stripper interrupts stripper movement while the ram disengages from the stripper and continues to move.

16. The improvement of claim 13 including further coordinating means for insuring that ram length variations are associated with like movement of the finger elements and stripper home position.

17. The improvement of claim 16 wherein the further coordinating means comprises a member effective near one extreme of ram reciprocation to angularly couple a portion of the ram and a portion of the finger element position varying means for selective corotation.

18. The improvement of claim 12 including additional finger elements interspersed among said finger elements fixed to and movable with the stripper relative to said finger elements.

19. The improvement of claim 18 wherein the additional finger elements and said finger elements are cantilever supported with respective free ends substantially coextensive when the stripper is in the home position.

20. The improvement of claim 12 including a shaft supported finger holder with the finger elements cantilevered therefrom and with a surface portion thereof determining the stripper home position.

* * * * *